United States Patent [19]

Denny

[11] 3,921,075

[45] *Nov. 18, 1975

[54] RADIO TELETYPE DETECTOR CIRCUIT

[75] Inventor: Robert B. Denny, Poway, Calif.

[73] Assignee: Adar, Inc., Santa Ana, Calif.

[ * ] Notice: The portion of the term of this patent subsequent to Dec. 31, 1991, has been disclaimed.

[22] Filed: June 24, 1974

[21] Appl. No.: 481,978

Related U.S. Application Data

[63] Continuation of Ser. No. 327,782, Jan. 29, 1973, abandoned.

[52] U.S. Cl. .................... 325/320; 178/66; 178/88; 325/30; 325/487; 329/104

[51] Int. Cl.² .......................................... H04L 27/14

[58] Field of Search ............. 325/30, 349, 320, 351, 325/487; 178/66, 88; 328/134; 329/104, 166, 50, 145, 192; 331/179

[56] References Cited

UNITED STATES PATENTS

| | | | |
|---|---|---|---|
| 3,746,997 | 7/1973 | Willett et al. | 325/349 |
| 3,792,364 | 2/1974 | Ananias | 329/50 |

*Primary Examiner*—Robert L. Griffin
*Assistant Examiner*—Marc E. Bookbinder
*Attorney, Agent, or Firm*—Knobbe, Martens, Olson, Hubbard & Bear

[57] ABSTRACT

Apparatus for detecting the output signals of a frequency-shift-keying receiver wherein identical filters are used for discriminating each of the two frequency signals to reduce the susceptibility of the apparatus to interference and wherein a squaring circuit is used as a detector to increase the output signal level and to increase the ability of the detector to discriminate between strong and weak signals.

1 Claim, 2 Drawing Figures

RADIO TELETYPE DETECTOR CIRCUIT

This is a continuation, of application Ser. No. 327,782 filed Jan. 29, 1973 now abandoned.

BACKGROUND OF THE INVENTION

This invention relates generally to frequency-shift-keying (FSK) receivers and more particularly to apparatus for use with such receivers to reduce the susceptibility of such receivers to radio frequency interference and to increase the ability of such receivers to differentiate between signals of varying amplitude.

In FSK transmission, a mark is transmitted on one frequency and a space is transmitted on another frequency so that transmission is continuous but alternates between the pair of frequencies to determine the type of signal being transmitted. In the present application a receiver is used which receives the FSK transmission and converts it to a signal which varies between two frequency tones, one of which is always assumed to be present. In order to discriminate this signal and to thereby determine whether a mark or space is being received, it has been common practice in the prior art to apply the signal to dual filter channels, with one filter tuned to the mark frequency and the second filter tuned to the space frequency. The process of deciding whether a mark or a space signal has been received has normally consisted of determining which of the filters has the greater output. As the signal being received becomes weaker, as may be the case, for example, with increased distances between the transmitter and receiver, the susceptibility of prior art receivers to interference increases. This susceptibility has been aggravated but the fact that the dual filter channels, in most cases, comprise filters tuned to different frequencies and therefore, of necessity, introducing different time delays to the received signals. Thus, interference signals reach the differentiating circuit at different times and, rather than cancelling one another, are interpreted as a mark following immediately by a space, or vice versa. In addition, it is well known that as the signal to noise ratio is reduced, it becomes increasingly difficult to differentiate between a received signal and the background noise by simply comparing the output of the dual channel filters.

SUMMARY OF THE INVENTION

The present invention alleviates these difficulties in prior art FSK receivers by assuring that the time delay through each of the filter channels is identical, thereby introducing identical time delays to interference signals passing through each of the channels and resulting in an optimum cancellation of the interference signal at the differentiating circuit. In addition, the present invention utilizes a multiplier rather than a standard rectifier for detecting the output of each of the filters so that the difference in amplitude between the signals from each of the dual channel filters in enhanced, thereby increasing the sensitivity of the differentiating circuit to minor variations in the relative amplitude of the incoming signals.

More precisely, the present invention utilizes a heterodyning technique which enables the use of identical filters in each of the dual filter channels, such identical filters introducing, of necessity, identical delays to signals passing therethrough. In order to utilize such identical filters, the output from the FSK receiver is coupled directly to one of the identical filters. The output from the FSK receiver is additionally heterodyned with the frequency signal from a local oscillator. Since the local oscillator frequency is selected to be equal to the sum of the two frequencies produced by the FSK receiver, an identical filter may be used to filter the second channel. The output of each of the filters is then applied to each of the two inputs of a multiplier so that a square of the filter output signal is produced. This multiplier or squaring circuit replaces the well known rectifying detector used in prior art receivers. The squared signals are then compared in a differentiating device to determine which has the higher amplitude. The use of the squared signal enhances the capability of the differentiating device to properly respond to signals whose amplitude varies only by a relatively small amount.

These and other features of the present invention are best understood by reference to the drawings in which:

FIG. 1 is a schematic block diagram of the apparatus of the present invention; and FIG. 2 is a graphical representation of the effect of the squaring detectors of FIG. 1 on signals of varying amplitudes.

DETAILED DESCRIPTION OF THE PREFERRED EMBODIMENT

Figure 1:
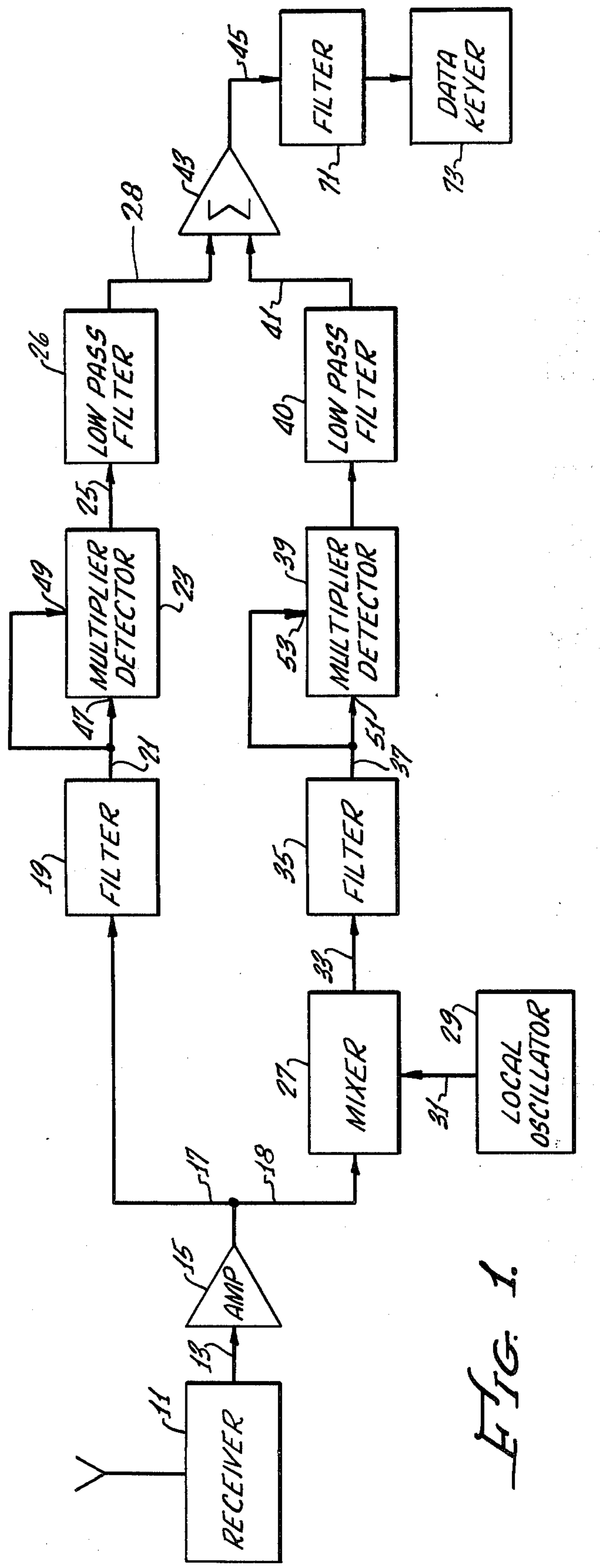

Referring to FIG. 1, a receiver 11 is used to intercept transmitted FSK signals and to produce on an output line 13 an output signal consisting of two tones representing mark and space transmissions. It will be readily understood by those familiar with such receivers 11 that the signal on the line 13 ccontinuously includes modulation, but alternates between each of the FSK frequencies. In a fairly common mode of transmission, for example, the signal on the line 13 alternates between 1,575 Hz to designate a space and 2,425 Hz to designate a mark. It will also be readily understood by those familiar with such receivers 11 that the signal on line 13 includes modulation produced by interference. It is the purpose of the circuit to be described below to determine which of the alternate frequency tones has the higher amplitude on line 13, and to reduce, as far as possible, the effect of signals produced by interference on this determination. The signal on line 13 is amplified by an amplifier 15 and is conducted to each of a pair of filter channels via lines 17 and 18. The first filter channel connected to line 15 includes a band pass filter 19 which is tuned to one of the incoming frequency tones. For the sake of explanation only, it will be assumed that the filter 19 is a band pass filter which is tuned to 1,575 Hz and which rejects 2,425 Hz. The output of the filter 19 on line 21 therefore consists of the space FSK tone, in addition to any signals produced by interference which have a frequency component within the pass band of the filter 19. This signal 21 is detected in a detector 23 to produce a rectified signal output on the line 25, which signal is applied to a low pass filter 26 to remove all but the DC components of the signal on line 25. The signal at the output of the filter 26, on line 28, is therefore indicative of the DC level of the signal on line 21.

The output of the amplifier 15 is additionally coupled by means of line 18 to one input of a mixer 27. A local oscillator 29 is utilized to generate a local oscillator signal on line 31 for combination in the mixer 27 with the signal on line 18. The output of the mixer 27 is coupled via line 33 to a second band pass filter 35.

Since, as noted above, interference will produce signals on each of lines 17 and 18 which may pass through the filters 19 and 35, it has been found desirable to assure that the time delay through each of the filters 19 and 35 for all signals which are within the pass band of these filters is identical. In order to accomplish this, the filters 19 and 35 are of identical construction and therefore are each tuned to pass, by way of example, the space frequency 1,575 Hz but not the mark frequency 2,425 Hz. The mixer 27 and local oscillator 29 are therefore used to convert the mark signal to 1,575 Hz so that it may be properly filtered by the filter 35. In order to accomplish this, the local oscillator output frequency is selected to be the sum of the mark and space frequencies, that is 4,000 Hz. In addition, the mixer 27 is designed to multiply the signal on line 18 by the signal on line 31, and is selected to be a full four-quadrant multiplier so that the output of the mixer on line 33 comprises signals equivalent to the sum and different of the signals on lines 18 and 31, without a substantial contribution of the signal on line 18 itself. The difference signal on line 33 is thus the difference between the local oscillator frequency and the mark frequency, that is, the space frequency, when a mark is being transmitted. Similarly, the difference signal is the difference between the local oscillator frequency and the space frequency, that is, the mark frequency, when a space is being transmitted. Thus, the filter 35, being tuned to the space frequency 1,575 Hz, will produce an output at 1,575 Hz only when the mark frequency is present on line 18. It will be readily understood that the mixer or multiplier 27 introduces no significant delay to the signal on line 18, so that the total delay at the output 37 of the filter 35 is equivalent to the total delay at the output of the filter 19 on the line 21. The output of the filter 25 on line 37 is conducted to a detector 39 and low pass filter 40 which are identical to the detector 23 and low pass filter 26 and produce a DC signal on a line 41. The DC signals on lines 25 and 41 are connected to a summation node 43 which, in the preferred embodiment, is a differential amplifier. The differential amplifier 43 is therefore responsive to the differential between the DC signal level on lines 25 and 41 and produces an output signal on line 45, the polarity of which is determined by which of the signals on lines 25 and 41 has the highest amplitude.

In order to increase the sensitivity of the differential amplifier 43 to minor differences in the amplitudes of the signals on lines 25 and 41, such as may occur when the receiver 11 is receiving relatively weak signals, the detectors 23 and 39 consist of full four-quadrant multipliers, each of the inputs 47 and 49 of the multiplier 23 being connected to line 21 and each of the inputs 51 and 53 of the multiplier 39 being connected to line 37.

Figure 2:
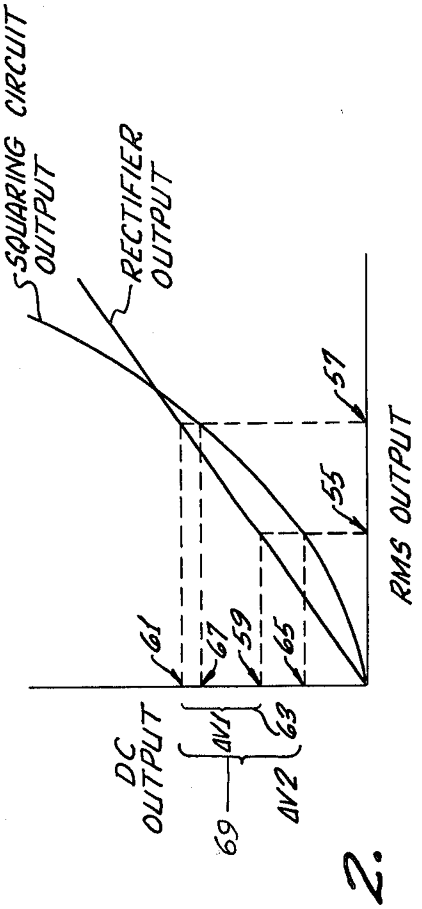

The advantages of the use of multipliers for the detectors 23 and 39, as opposed to commonly used rectifiers for this purpose, is best understood by reference to FIG. 2, which is a graph showing the DC output level of the low pass filters 26 and 40 corresponding to changes in the RMS input from the filters 19 and 35. It may be seen that RMS inputs at levels indicated by the arrows 55 and 57 will produce DC outputs, using a standard rectifier detector, shown by the arrows 59 and 61. It will be recognized by those familiar with such standard rectifier detectors that these devices exhibit a non-linear or square law transfer function through a small weak signal portion of their dynamic range. However, throughout the greater portion of the dynamic range of these devices, and throughout the range normally used for detector purposes, such devices normally exhibit a linear transfer function as shown in FIG. 2. If a rectifier were designed to operate within the square law portion of its dynamic range for detector purposes, it would be within the scope of the present application. If it is assumed, therefore, that the levels 55 and 57 are equivalent to the outputs of the filters 19 and 35 at a particular point in time, the difference in voltage, ΔV1, which is available at the differential amplifier 43 for making a determination of which voltage is high is shown by the bracket 63. If, however, multipliers 23 and 39, as described in reference to FIG. 1, are utilized for detecting the outputs of filters 19 and 35, the RMS inputs 55 and 57 produce DC output levels from the low pass filters 26 and 40 shown by the arrows 65 and 67, resulting in a substantially increased voltage differential, ΔV2, shown by the bracket 69. Thus, the use of the multipliers 23 and 39, by producing the square of the output of the filters 19 and 35, respectively, results in a substantially increased voltage differential for application to the differential amplifier 43.

Referring again to FIG. 1, it will be recognized that, since the time delay introduced by the multipliers 23 and 39 is insignificant, and since the time delay introduced by the filters 19 and 35 is identical due to their identical construction, any interference received by the receiver 11 and having comparable components at both the mark and space frequencies, will arrive simultaneously at the differential amplifier 43 and will therefore produce no net effect upon the differential amplifier 43, the noise being totally cancelled. The output of the differential amplifier 43 on line 45 is coupled to a low pass filter 71 to remove all but the DC components on the line 45 and the output of the filter 71 is connected to a data keyer 73, such as is commonly used with FSK receivers.

The use of identical filters 19 and 35 to introduce identical time delays in each of the filter channels and thereby reduce the effect of interference, and the use of the multipliers 23 and 39 for detecting the filtered signals, each contribute to a substantial reduction in the effects of signal fading on the quality of the received information.

In addition to the production of identical time delays in each of the filtered channels, the use of identical filters 19 and 35, of necessity, insures that the area under the filter frequency response curves is identical, so that equal noise energy is transmitted through each of the channels, producing optimum cancelling of wide band or white noise.

What is claimed is:

1. A circuit for detecting the differential amplitude of a pair of frequency tones in a frequency-shift-keying receiver, comprising:

a pair of filter circuits, each filter circuit responsive to a different one of said frequency tones, each of said pair of filter circuits including a filtering element of identical construction, one of said pair of filter circuits additionally comprising:

means for heterodyning one of said pair of frequency tones to provide a heterodyned signal to the filtering element in said one of said pair of filter circuits.

a pair of squaring and detecting circuits, each connected to the output of a different one of said filter circuits for squaring and detecting the presence of one of said frequency tones, said squaring and detecting circuits increasing the sensitivity of said differential amplitude detecting circuit to minor differences in amplitude of said pair of frequency tones, each of said squaring and detecting circuits comprising:

a multiplier having two inputs, each of said inputs being coupled to the same output signal from its respective filter circuit; and a subtracting circuit responsive to the relative amplitude of the outputs of said pair of squaring and detecting circuits to produce a signal the polarity of which is determined by which of said pair of frequency tones has the higher amplitude.

* * * * *